No. 806,008. PATENTED NOV. 28, 1905.
A. SCHOENHUT.
JOINTED FIGURE.
APPLICATION FILED APR. 16, 1904.
2 SHEETS—SHEET 1.
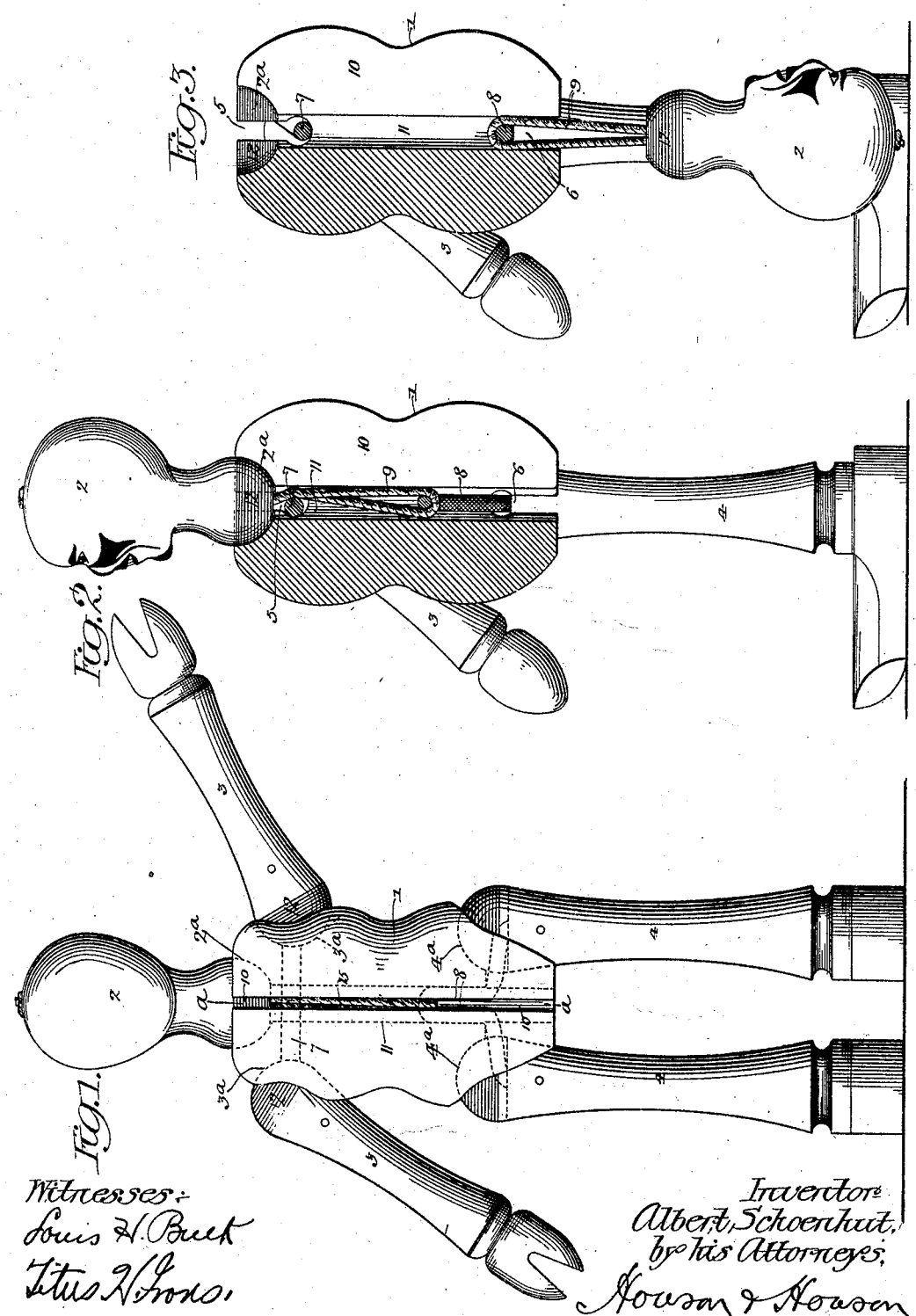
Witnesses:
Louis H. Buck
Titus H. Cross
Inventor:
Albert Schoenhut,
by his Attorneys,
Howson & Howson No. 806,008. PATENTED NOV. 28, 1905.
A. SCHOENHUT.
JOINTED FIGURE.
APPLICATION FILED APR. 16, 1904.
2 SHEETS—SHEET 2.
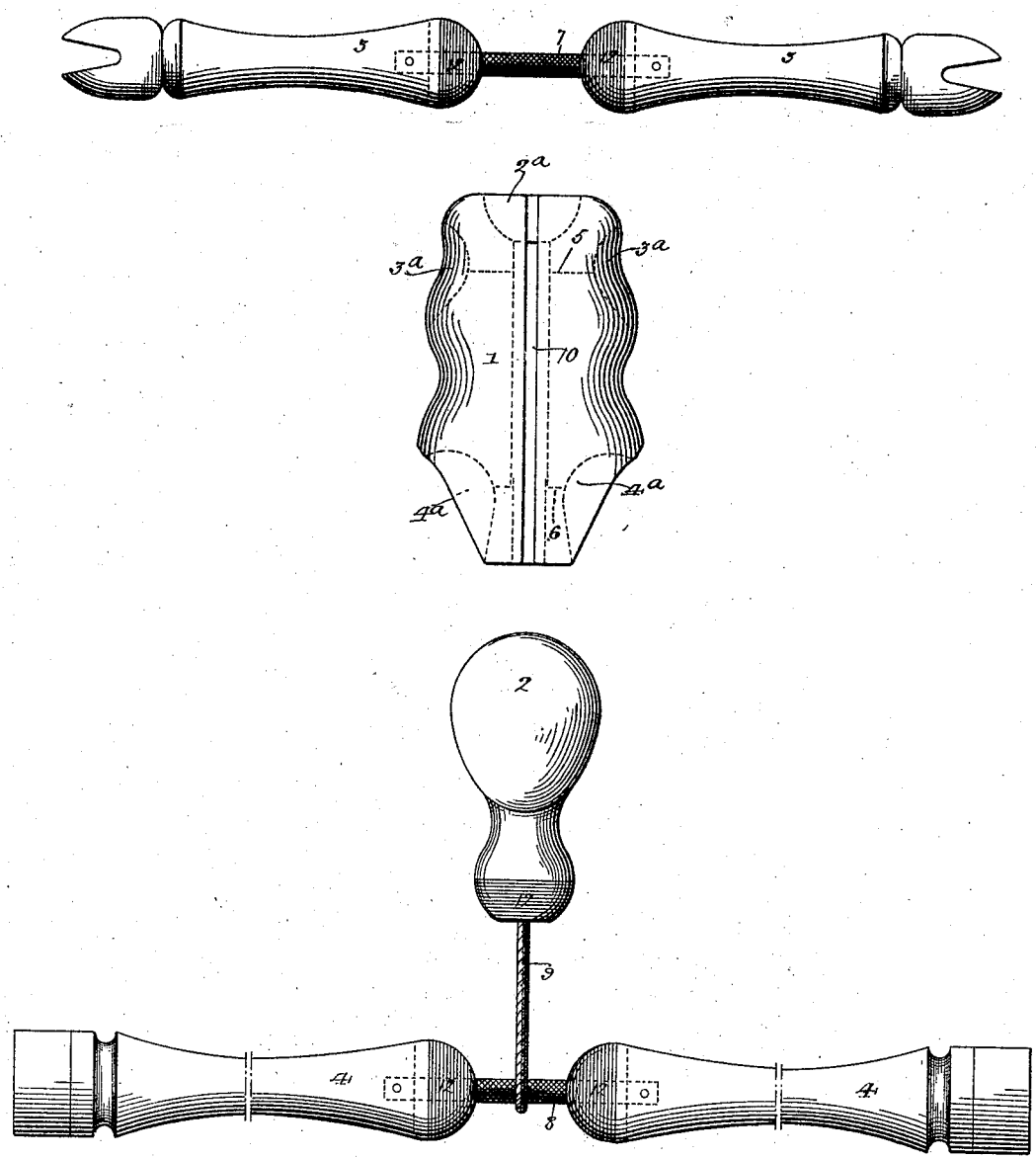

UNITED STATES PATENT OFFICE.

ALBERT SCHOENHUT, OF PHILADELPHIA, PENNSYLVANIA.

JOINTED FIGURE.

No. 806,008.  Specification of Letters Patent.  Patented Nov. 28, 1905.

Application filed April 16, 1904. Serial No. 203,437.

*To all whom it may concern:*

Be it known that I, ALBERT SCHOENHUT, a citizen of the United States, residing in Philadelphia, Pennsylvania, have invented certain Improvements in Jointed Figures, of which the following is a specification.

My invention relates to jointed figures in the form of toys, dolls, &c., and comprises an improvement upon the jointed figure shown and described in my prior patent, No. 725,594, dated April 14, 1903.

The object of my present invention is to simplify the method of assembling jointed toy figures, dolls, and the like, whether made in accordance with my prior patent or not.

My invention is fully shown in the accompanying drawings, in which—

Figure 1 is a rear elevation of a jointed figure, manikin, or doll made in accordance with my invention. Fig. 2 is a sectional view taken on the line $a$ $a$, Fig. 1. Fig. 3 is a similar sectional view showing the parts in semidetached condition, and Fig 4 is a view illustrating the parts of the figure detached.

In the structure forming the subject of my former patent a body was provided having sockets to receive the ends of the limb members, with slots connecting said sockets, so that the limb members in a connected condition could be readily assembled in place. When so assembled, the limb members were held by the head member, which was seated in a socket directly over the slot connecting the sockets for the arm members, and had a cord which was attached to the connection for the leg members. This cord was connected to the head by passing it through a hole in the same and then confining it in place by an engaging member or other suitable means, and it was necessary to disconnect the head and cord before the several limb members could be removed. In the construction forming the subject of my present invention, however, which is fully shown in the accompanying drawings, I do away with the necessity of disconnecting the head and cord and provide the body with a slot for the passage of this cord, so as to obviate the necessity of disconnecting the parts when assembling or dismembering the structure.

In Fig. 1, 1 represents the body having sockets for the head and arm and leg members, (indicated at 2, 3, and 4, respectively,) the socket for the former being indicated at $2^a$, the arm-sockets at $3^a$, and the leg-sockets at $4^a$. The body is provided with the sockets and the slots 5 and 6, connecting those for the arms and legs in the same manner as the structure of my former patent above referred to, and the several members are connected together by elastic cords, (indicated at 7 and 8 in the several views.) In assembling or dismembering the patented structure, however, it is necessary to disconnect the head from its cord 9 before it is possible to disconnect the other members of the toy, and to avoid this I provide in the present structure the body 1 with an additional slot 10 at the back, which extends from the surface of the body through to the central opening 11 between the upper and lower slots 5 and 6. By this means when the parts of the structure are assembled or dismembered this slot provides for the passage of the cord 9, connected to the head, which cord is passed around the connection for the leg members. When assembling the structure, therefore, the cord 9 will be firmly connected to the head by any suitable means. For instance, the head may have an aperture extending through the same, and the cord may be knotted on the outside at the top, or the cord may be passed into said aperture and held by a nail or tack. One of the leg members will then be slipped through the loop of this cord until its connection is engaged by the same, and said leg members will then be fitted in their proper seats. The arm members in their connected condition will then be seated in the usual manner, and after this has been done the head will be pulled toward its socket or seat, the cord attached to the same stretching the elastic connection for the leg members, thereby holding the same firmly to their sockets or seats and by continuing the pulling on the head the cord will pass into the slot, and with a little effort the head may be properly seated in its socket. Instead of a doubled cord I may provide a single cord with a hook.

An additional feature of my invention consists in providing means for increasing the friction of the joints of the limbs of the body. These are substantially ball-and-socket joints, the said limbs being substantially round and fitting substantially round sockets. I prefer to make the parts of the figure of wood or similar material, and I find that these parts as turned are very smooth and that friction is reduced to a minimum. While I desire, of course, that the said limbs may be readily turned in their sockets, and this may be accomplished by stretching their elastic connections, I prefer to provide means for limiting such turning movement, so that it will not take place accidentally. To accomplish this, I coat the sockets of the body 1 with rosin or similar friction-producing material, thereby increasing the resistance to the turning of the limbs, and I may also coat the rounded ends of the limb members, as indicated at 12.

Having thus described my invention, I claim and desire to secure by Letters Patent—

1. A jointed figure comprising a body, a head, and arm and leg members, said body being constructed to retain the head and arm and leg members in proper position, connections for said arm and leg members, and retaining means carried by the head and engaging the connection for the leg members, said body having an open slot extending inwardly from its surface for the passage of said retaining means.

2. A jointed figure comprising a body, a head, and arm and leg members, said body being constructed to retain the head and arm and leg members in proper position, connections for said arm and leg members, and retaining means carried by the head and engaging the connection for the leg members, said body having a straight-walled vertical open slot extending inwardly from its surface for the passage of said retaining means.

3. A jointed figure comprising a body, a head, and arm and leg members, said body being constructed to retain the head and arm and leg members in proper position, connections for said arm and leg members, and retaining means carried by the head and engaging the connection for the leg members, said body having a central bore to accommodate the retaining means when the figure is assembled and an open slot extending inwardly from its surface for the passage of said retaining means to said central bore.

In testimony whereof I have signed my name to this specification in the presence of two subscribing witnesses.

ALBERT SCHOENHUT.

Witnesses:
MURRAY C. BOYER,
JOS. H. KLEIN.